Figure 1:
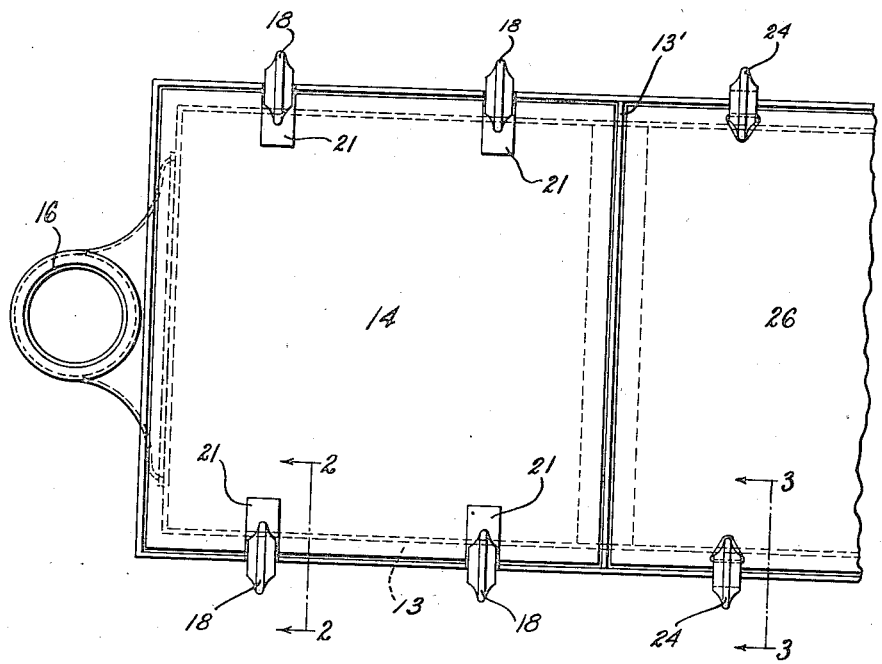

Dec. 10, 1935.  E. H. HAUTZ  2,023,924

SEWAGE AERATING APPARATUS

Filed Dec. 29, 1933

INVENTOR
EDWARD .H. HAUTZ
BY
*Brockett, Hyde, Higley & Meyer*
ATTORNEYS

Patented Dec. 10, 1935

2,023,924

UNITED STATES PATENT OFFICE 2,023,924

SEWAGE AERATING APPARATUS

Edward H. Hautz, Lakewood, Ohio

Application December 29, 1933, Serial No. 704,537

2 Claims. (Cl. 210—7)

This invention relates to an aerating device for sewage disposal plants and particularly to a means for securing air diffusion plates therein.

In certain types of sewage disposal plants the sewage is treated by submitting it to the action of aerobic bacteria. The sewage, mixed with a suitable proportion of previously prepared activated sludge, is held in large tanks for a predetermined period of time or permitted to flow slowly therethrough.

In the lower portion of the tanks air passageways are provided and air under pressure is passed through the sewage through diffusing plates which cause a curtain of small air bubbles to pass upward through the material in the tank. The activated sludge is previously provided with the necessary minimum of aerobic bacteria and the current of air promotes the growth of the bacteria while at the same time suitably stirring the mass of sewage.

It is frequently necessary to remove the air diffusing plates for cleaning or because of breakage and an object of this invention is to provide retaining means for such plates which will permit their ready removal.

Another object of the invention is to arrange for the removal of air diffusion plates expeditiously so that the equipment will be out of operation for the least possible time.

Other objects and advantages will more clearly appear hereinafter from the accompanying description together with the drawing.

Figures 2, 3:
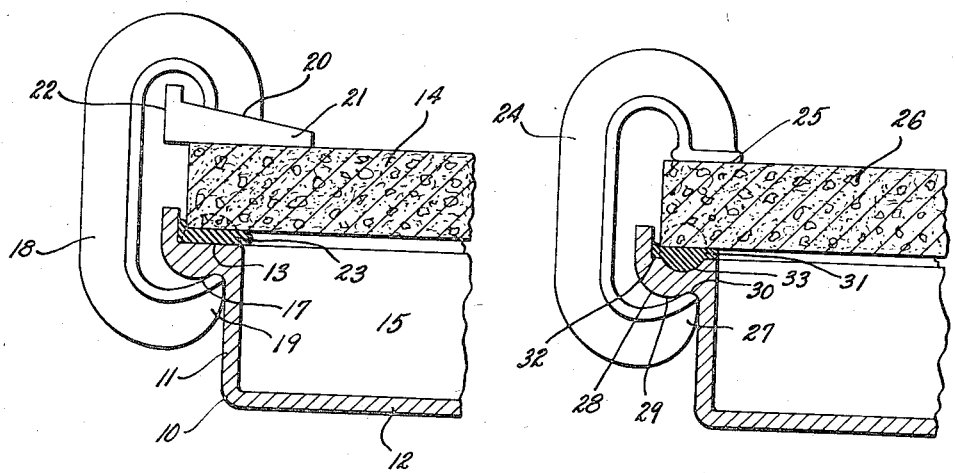

In the drawing, Fig. 1 is a partial plan view of a tray having air diffusion plates held in place by my improved device; Fig. 2 is a partial sectional view somewhat enlarged along the line 2—2, of Fig. 1; while Fig. 3 is a view similar to Fig. 2 along the line 3—3 of Fig. 1 showing a modified form of the device.

The sewage treating tanks in disposal plants are generally of considerable size being possibly hundreds of feet long, twenty feet wide, more or less, and ten to fifteen feet in depth. In such apparatus the aeration chamber comprises air diffusing plates arranged in the bottom of the tank with air supply passages communicating therewith. The plates are arranged in any suitable fashion, either transversely or longitudinally of the bottom of the chamber. The usual construction is similar to that illustrated and described in the patent to Lorenzo S. Washburn No. 1,681,890, granted August 21, 1928. As illustrated in the aforesaid patent, it is common to secure the diffusion plates in position by cementing them in their proper position, but this arrangement makes the removal of the plates a long and tedious operation with the additional disadvantage that many plates are broken during replacement or cleaning.

My improved device comprises trays adapted to be arranged in the bottom of an aerating chamber, such trays having side walls provided with a shoulder above the bottom and an air distributing member supported on the shoulder. Deformations are provided in the outer portion of the side walls of the trays and substantially C-shaped clamps are arranged each with one end held by said deformation and the other end in position to apply pressure on the upper surface of an air distributing member. In one form of the device a wedge member is provided to properly clamp the parts together and, in a modified form, certain of the parts are yieldingly or resiliently constructed so as to provide a clamping action.

The drawing illustrates a tray 10 having side walls 11 and a bottom 12, there being a shoulder 13 on said side walls which is adapted to support an air distributing member or plate 14 in position spaced above the bottom 12. Suitably spaced cross members 13' may be arranged to support the edges of contiguous air diffusing members. The trays may be made of metal or ceramic material suitable for the purpose. This construction provides an air supply duct 15 which communicates with a source of air, as by way of a conduit 16 at one end of the tray. The air distributing member may be formed of any suitable material such as silica or carborundum, metallic fabric or other porous material of such a nature as to break up the air into very fine streams. These members are usually supplied in rectangular shapes, those shown being substantially square, but it will be understood that my invention is applicable to air distributing members of various shapes.

In the form shown in Fig. 2, one of the outer walls of the tray is provided with a deformation 17 and a substantially C-shaped clamp 18 is provided which is adapted to have its lower end 19 held by said deformation and its upper end 20 in position spaced from the upper surface of the air distributing member 14. The end 20 is sloped in a manner to cooperate with a wedge 21 which is placed between the clamp and air distributing member before the clamp is positioned and thereafter driven home by inserting a suitable tool behind the end 22 of the wedge. The thicker end of the wedge thus lies within the C-shape opening of the clamp and the wedge is driven home in the direction of clamp application. A gasket 23 may be provided between the air distributing member and the shoulder 13 to provide a certain amount of resilience in the clamping action and to prevent leakage of air around the edges of the plate. The gasket 23 may be of rubber or other suitable material and as shown comprises a member half round in section placed with its diameter against the shoulder 13 and adapted to be somewhat deformed by the clamping pressure.

In the modification shown in Fig. 3, the clamp 24 is provided with an upper end 25 which is adapted to rest directly upon the air distributing member 26 and the lower end 27 of the clamp is adapted to rest against a deformation 28 on the side wall of the tray. This deformation is arranged in such a manner that the clamp must be snapped into position, that is to say, it passes over a portion 29 on the shoulder or deformation 28 which provides a squeezing action on the members clamped together, and thereafter the end of the clamp rests in a depression 30 when the clamp is in its final clamping position. To permit the movement of the clamp over the raised portion 29, a yielding or resilient member is provided in the clamping system which, in the form illustrated, comprises a resilient gasket 31 lying between the member 26 and a shoulder 32 on the tray. This gasket may be of rubber or other suitable material and as illustrated comprises a gasket of round section and the shoulder 32 is provided with a trough 33 which conforms to the lower side of the gasket. It will be readily apparent that, when the clamp 24 is moved toward clamping position, the gasket 31 will be placed under compression as the clamp end 27 passes over surface 29 and the gasket by its resilient character will hold the lower end of the clamp in the depression 30 of the side wall of the tray, thus holding the air diffusing plate firmly in position.

While the deformations or shoulders 17 and 28 have been shown located substantially directly beneath the shoulders 13 and 32, it will be understood that this position may be changed as desired, it being necessary only that one end of the clamp should be held by the tray while the other end of the clamp produces pressure upon the upper surface of the air distributing member.

I have thus provided means for securing air diffusing plates in position over a tray or conduit which is extremely simple and easily applied and removed. The type shown in Fig. 2 might be used for a diffusion member of a material such as carborundum which is adapted to withstand the strains incident to driving the wedge in place, whereas the form shown in Fig. 3 might be used with an air distributing member of such a material as silica, which is more easily broken when clamped in position.

The clamps are of a simple form which may be pressed, forged or cast of any suitable material of a section adapted to withstand the strains involved. The form shown in Fig. 2 requires but two parts and the form shown in Fig. 3 requires but one part, together with suitable gaskets where necessary.

I have thus provided a very cheap and simple clamping means for use in sewage disposal plants but one which is very efficient. The air distributing plates are not broken when my improved device is used and, where necessary to remove the plates for cleaning, the apparatus is out of service a minimum time.

What I claim is:

1. In an aerating device, walls forming an air container having an open side, said walls forming a continuous shoulder about said open side, an air distributing member adapted to engage said shoulder and to close said side, a resilient gasket between said shoulder and said member, a deformation on the outer wall of said container having a portion extending away from said shoulder and another recessed portion extending thereto-ward, a rigid non-adjustable C-shaped clamp, said clamp in clamping position having its one end engaging the outer face of said member and having its other end engaging the recessed portion of said deformation, said clamp being arranged with a span between its ends adapted to hold said gasket in compression when clamped, and the outwardly extending portion of said deformation lying within the limits of resilience of said gasket, whereby said clamp may be moved into clamping position by compressing said gasket as said clamp moves over the high point of said deformation.

2. An aerating device for sewage disposal plants, comprising a tray having side walls providing a continuous shoulder above its bottom, an air distributing porous block member supported on said shoulder, a resilient gasket between said shoulder and said member, a deformation on the outside of one of said side walls below the level of said shoulder, said deformation having a surface extending from its outer end inwardly first away from said shoulder to form a high point and then toward said shoulder to form a recess, a rigid non-adjustable substantially C-shaped clamp, said clamp in clamping position having one end held by said deformation and the other end arranged to apply pressure upon said member, and said clamp being arranged with a span between its ends adapted to compress said gasket as the clamp is moved over said high point and to release a part of said compression as said clamp moves into said recess to clamping position.

EDWARD H. HAUTZ.